Patented Mar. 8, 1927.

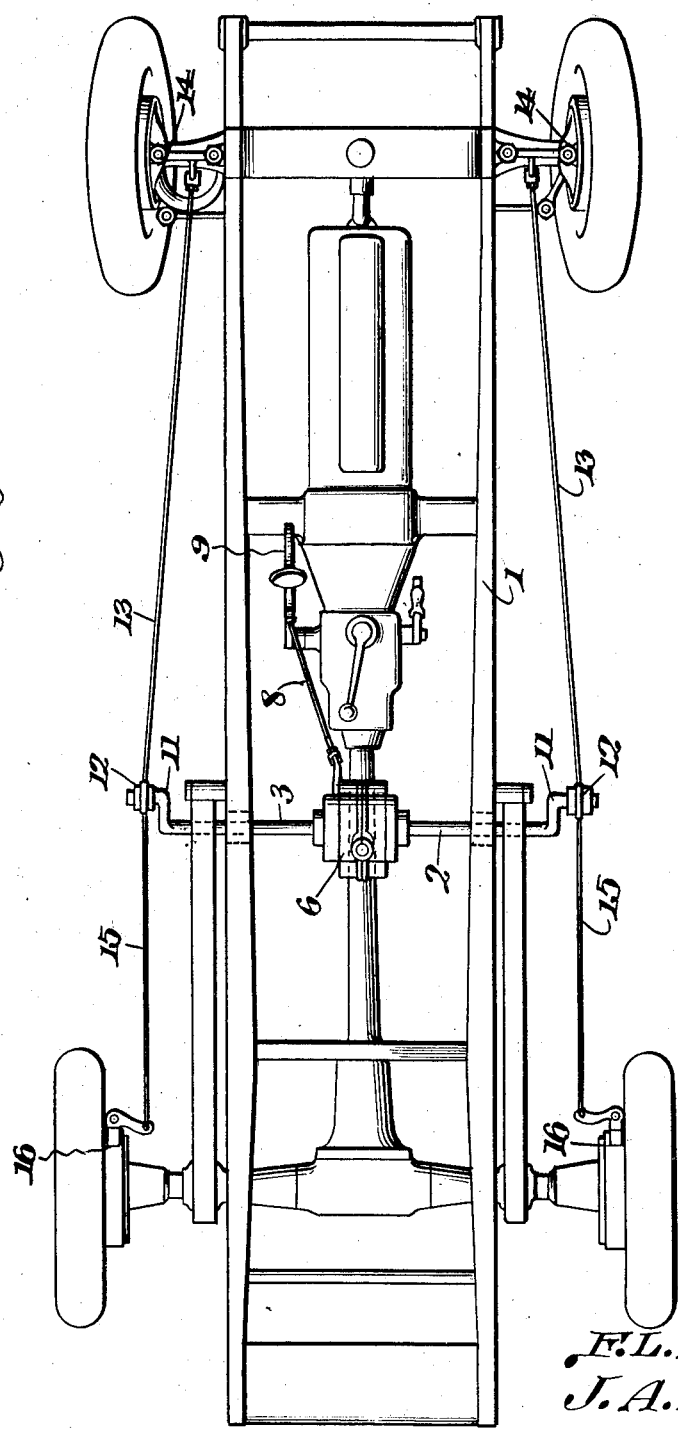

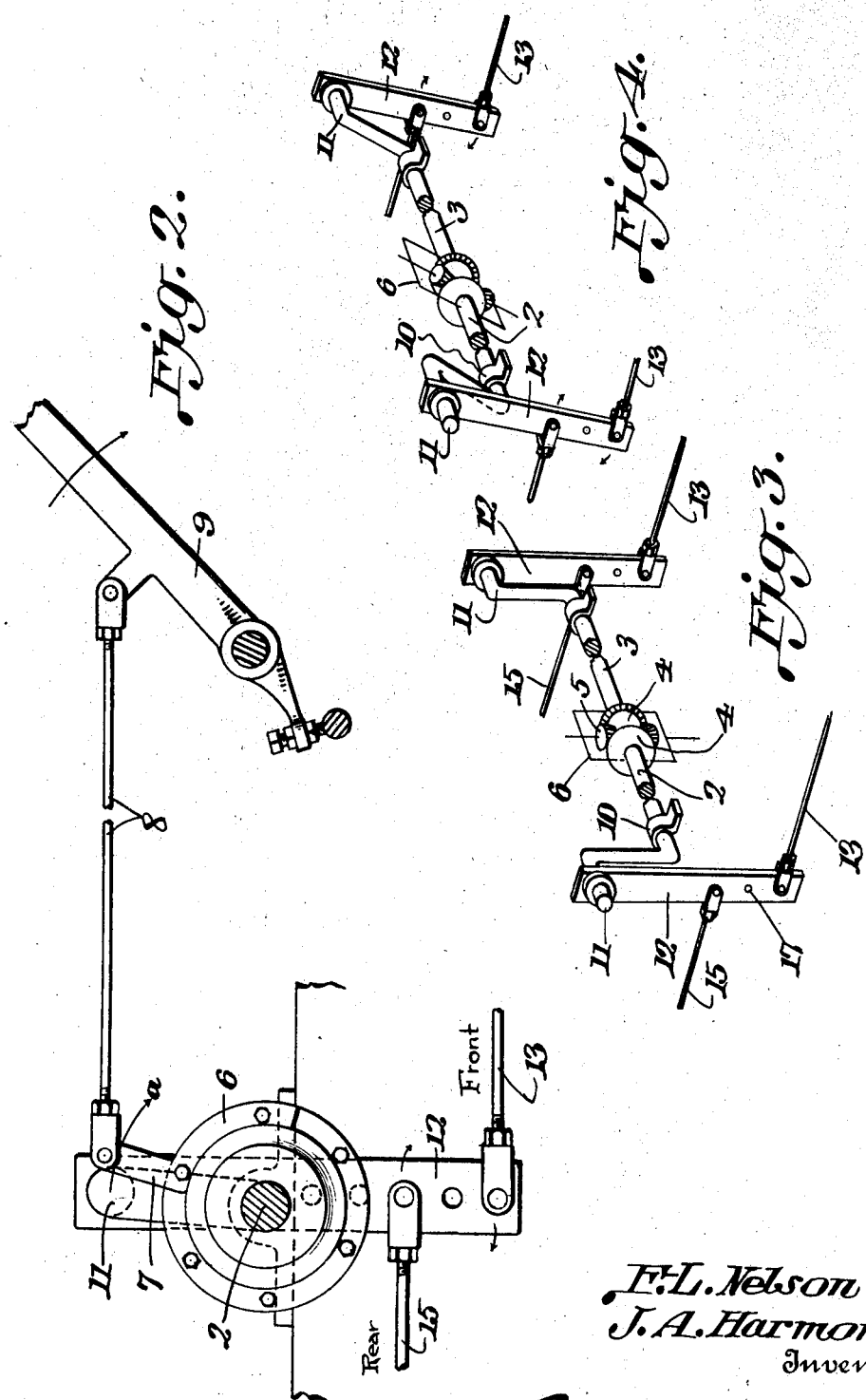

1,620,221

UNITED STATES PATENT OFFICE.

FYAN L. NELSON AND JAMES A. HARMON, OF UVALDE, TEXAS.

EQUALIZER FOR FOUR-WHEEL BRAKES.

Application filed July 28, 1926. Serial No. 125,428.

This invention relates to an equalizer for four wheel brakes such as used, for example, on automobiles.

One of the objects of the invention is to provide simple and efficient means whereby the transmission of force to the four brakes will be simultaneous, it being possible, however, to so adjust the mechanism that the rear brakes will be applied with greater force than the front brakes, thereby avoiding the danger resulting from application of brakes to the front wheels in advance of the rear wheels.

A further object is to provide equalizing mechanism which will compensate for wear upon the several brakes so that after the parts have once been set they will continue to operate in the manner desired.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a plan view of a portion of an automobile having the present improvements combined therewith, the brake mechanism at each wheel being shown more or less in diagram.

Figure 2 is an enlarged section through the brake equalizing mechanism.

Figure 3 is a perspective view of said mechanism, a portion thereof being shown in diagram.

Figure 4 is a similar view showing the mechanism shifted to another position.

Referring to the figures by characters of reference 1 designates the frame or chassis of an automobile and extending transversely thereof is a differential including alining shafts 2 and 3 provided, at their inner ends, with gears 4 meshing with interposed gears 5, these interposed gears being carried by a rotatable housing 6. This housing has an arm 7 projecting therefrom and connected by a rod 8 to a brake lever 9. Thus it will be seen that when the lever 9 is shifted the housing will be rotated and the gears 5 will cause the two shafts 2 and 3 to rotate although it is possible for each shaft to revolve independently of the other when the shafts are subjected to unequal resistances.

The shafts 2 and 3, which are suitably journaled on the chassis 1, as indicated at 10 are provided, at their outer ends, with crank arms 11. Each of these crank arms is journaled in the upper end of an equalizing lever 12 and secured to the lower portion of each equalizing lever is a rod 13 extending forwardly to one of the brakes of the front wheel, said brakes being indicated generally at 14. Additional rods 15 are extended rearwardly from the lever 12 to the rear brakes indicated generally at 16. A series of apertures 17 is provided in each lever 12 so that each rod 15 can be connected to the lever 12 at a desired distance above the point of connection between lever 12 and rod 13.

It will be apparent that, from the foregoing description, when the lever 9 is swung in the direction indicated by the arrow in Figure 2 for the purpose of applying the brakes, the differential housing 6 will be caused to rotate and at the same time the gears 5, which mesh with the gears 4, will rotate the shafts 2 and 3. Should these shafts be subjected to uneven resistances, they would be free to rotate relative to each other while being actuated by the housing.

As soon as the differential is turned in the direction indicated by arrow $a$ in Figure 2 the lower ends of the levers, which are anchored to the rods 13, become fulcrumed about which the levers 12 swing and during this swinging movement said levers pull through the rods 15 upon the rear brakes 16. While all four brakes will be applied simultaneously, the leverage exerted upon the rods 15 is greater than that exerted upon the rods 13 and it has been found, by actual test, that as a result of this arrangement the maximum force is applied to the rear brakes before being applied to the front brakes. By adjusting the point of connection between the rods 15 and levers 12 toward or from the rods 13, the relative action of the brakes can be varied but in no instance will the front brakes be fully applied in advance of the full application of the rear brakes.

Obviously by providing mechanism such as described an equalizing action takes place as a result of the relative rotation of the shafts 2 and 3 and an additional equalizing action takes place as a result of the movement of the floating levers 12.

What is claimed is:

1. The combination with the front and rear brakes of a motor vehicle, of a transversely disposed differential including relatively rotatable shafts, means under the control of the driver for rotating the differential, a crank carried by each shaft of the differential, a floating lever suspended from each crank, and connections between each lever and a front brake and a rear brake, the front brake connection being disposed below the rear brake connection.

2. The combination with a motor vehicle having front and rear brakes, of a differential including a rotatable housing, said differential including separate shafts, means for actuating the housing to transmit power to the shafts, a crank carried by each shaft, a floating lever supported by each crank and connections between each lever and a front brake and a rear brake, the front brake connection being disposed at a greater distance from the axis of rotation of the shaft than the rear brake connection.

3. The combination with a vehicle having four wheel brakes, of a differential extending transversely of the vehicle and including separate shafts, a rotatable housing, and a differential connection within the housing between the shafts, means for rotating the housing to transmit motion to both shafts, a crank arm carried by each shaft, a floating lever supported by each crank arm, and means connecting each lever to a front brake and a rear brake, said means cooperating with the lever to apply maximum force to the rear brake in advance of the application of maximum force to the front brake.

In testimony that we claim the foregoing as our own, we have hereto affixed our signatures.

FYAN L. NELSON.
JAMES A. HARMON.